United States Patent
Rivera

(10) Patent No.: US 12,415,227 B2
(45) Date of Patent: Sep. 16, 2025

(54) REMOTELY OPERABLE WELDING MACHINE CONTROLLER DEVICE

(71) Applicant: Ruben Rivera, Evans, CO (US)

(72) Inventor: Ruben Rivera, Evans, CO (US)

( * ) Notice: Subject to any disclaimer, the term of this patent is extended or adjusted under 35 U.S.C. 154(b) by 721 days.

(21) Appl. No.: 17/863,977

(22) Filed: Jul. 13, 2022

(65) Prior Publication Data

US 2024/0017341 A1     Jan. 18, 2024

(51) Int. Cl.
*B23K 9/10*     (2006.01)

(52) U.S. Cl.
CPC .......... *B23K 9/1087* (2013.01); *B23K 9/1043* (2013.01)

(58) Field of Classification Search
CPC ............................... B23K 9/1087; B23K 9/10
USPC .................................................. 219/132, 663
See application file for complete search history.

(56) References Cited

U.S. PATENT DOCUMENTS

| | | |
|---|---|---|
| 4,216,367 A | 8/1980 | Risberg |
| 4,467,174 A * | 8/1984 | Gilliland ................... B23K 9/06 |
| | | 219/130.1 |
| 5,276,305 A | 1/1994 | Hsien |
| 7,205,503 B2 | 4/2007 | Reynolds |
| D679,738 S | 4/2013 | Segala |
| 8,642,921 B2 | 2/2014 | Savopoulos |
| 9,035,219 B1 * | 5/2015 | Schmidt ................... B23K 9/10 |
| | | 219/132 |
| 2005/0103768 A1 * | 5/2005 | Ward ..................... B23K 9/167 |
| | | 219/137.71 |
| 2016/0311046 A1 | 10/2016 | Aguilar |
| 2022/0168837 A1 * | 6/2022 | Knoener .............. B23K 9/0956 |

FOREIGN PATENT DOCUMENTS

WO     WO2018070365     4/2018

\* cited by examiner

*Primary Examiner* — Vy T Nguyen

(57) ABSTRACT

A remotely operable welding machine controller device for controlling a power output of an arc welding machine includes a housing and a remote control. A potentiometer and a power supply are attached to the housing. A motor is operationally engaged to a slider of the potentiometer and is positioned to selectively motivate the slider along turns of a resistance wire of the potentiometer to adjust a magnitude of current in a circuit in which the resistance wire is included. A power cord is attached to and extends from the housing. The power cord is electrically engaged to the potentiometer and operationally engages the potentiometer to a source of alternating current. The power supply is operationally engaged to the motor to selectively power the motor. The remote control is communicatively engaged to the motor is manipulatable by a user to selectively actuate the motor.

11 Claims, 6 Drawing Sheets

Relay Diagram

Relay Diagram

REMOTELY OPERABLE WELDING MACHINE CONTROLLER DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to welding machine controller devices and more particularly pertains to a new welding machine controller device for controlling a power output of an arc welding machine. The present invention discloses a welding machine controller device allowing remote control of magnitude of a current supplied to an electrode.

(2) Description of Related Art Including Information Disclosed Under 37 CFR 1.97 and 1.98

The prior art relates to welding machine controller devices, which may comprise secondary potentiometers, encoders that signal through welding wires, and wireless controllers. What is lacking in the prior art is a welding machine controller device comprising a motor for adjusting a potentiometer, wherein the motor is controlled via a wired or wireless remote.

BRIEF SUMMARY OF THE INVENTION

An embodiment of the disclosure meets the needs presented above by generally comprising a housing, which defines an interior space, and a remote control. A potentiometer and a power supply are attached to the housing, with the potentiometer being positioned in the interior space. A motor is operationally engaged to a slider of the potentiometer and is positioned to selectively motivate the slider along turns of a resistance wire of the potentiometer to adjust a magnitude of current in a circuit in which the resistance wire is included. A power cord is attached to and extends from the housing. The power cord is electrically engaged to the potentiometer and is configured to operationally engage the potentiometer to a source of alternating current. The power supply is operationally engaged to the motor to selectively power the motor. The remote control is communicatively engaged to the motor and is configured to be manipulated by a user to selectively actuate the motor to adjust the magnitude of the current in the circuit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
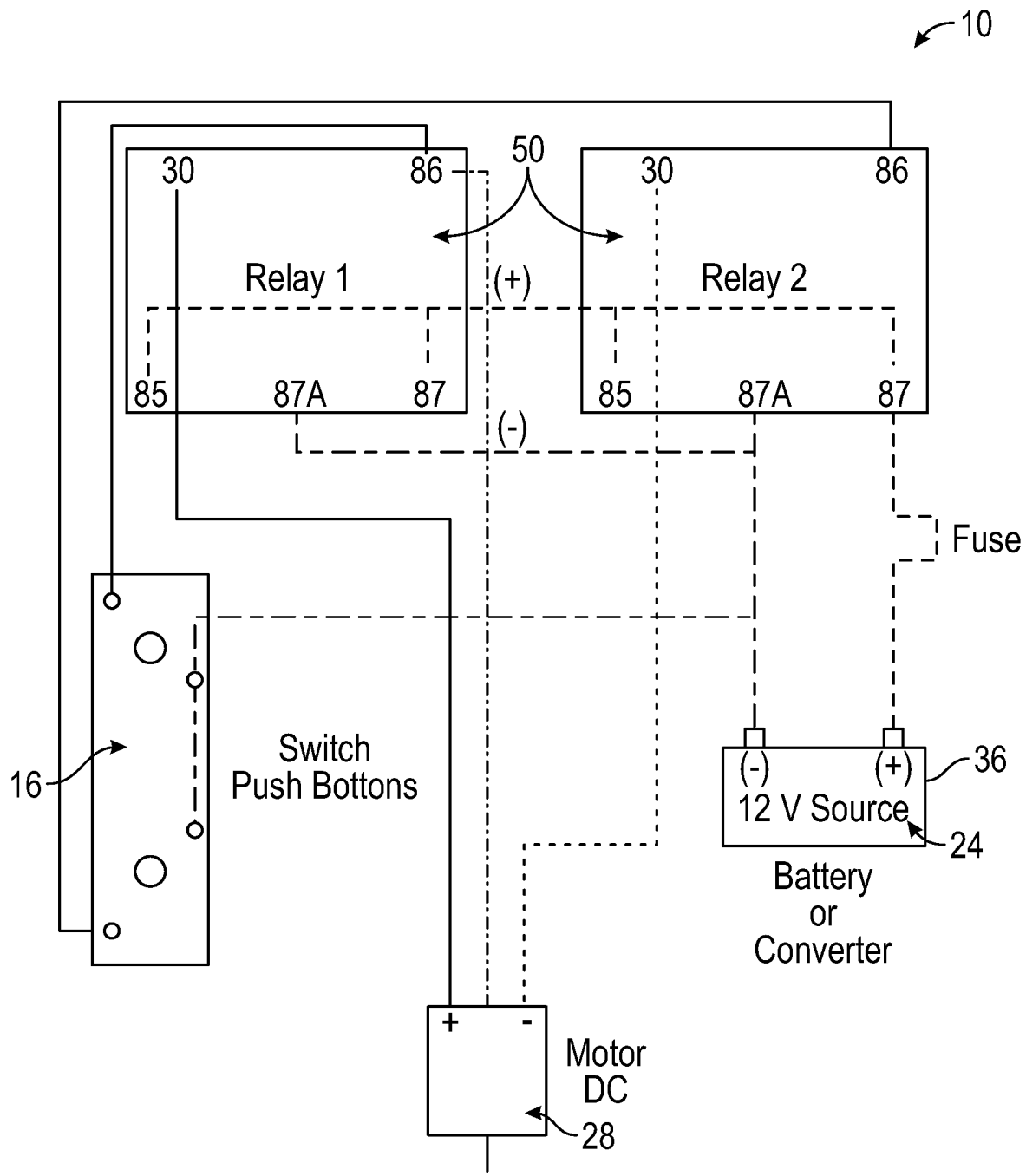
FIG. 1 is a relay diagram of a remotely operable welding machine controller device according to an embodiment of the disclosure.
Figure 2:
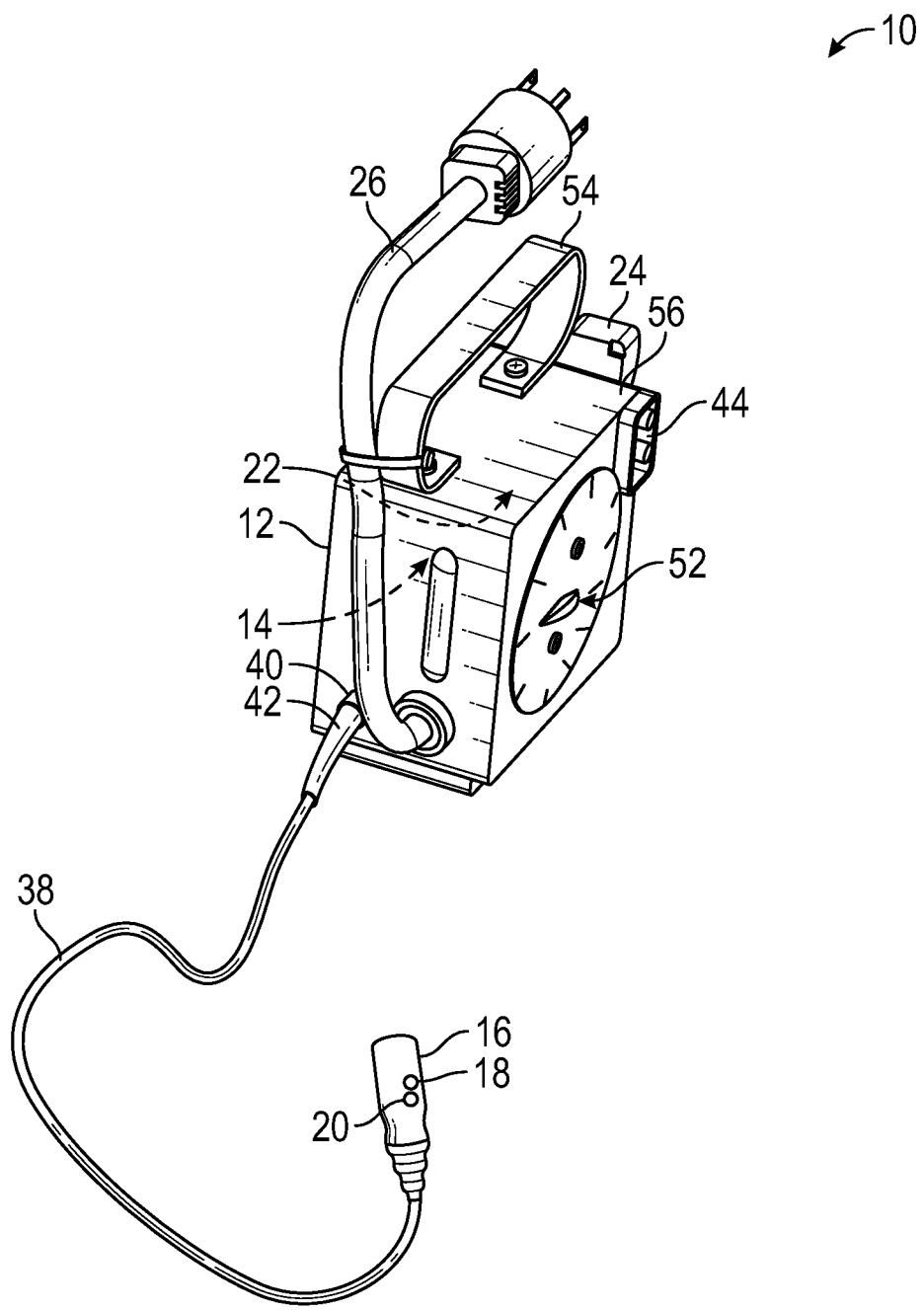
FIG. 2 is an isometric perspective view of an embodiment of the disclosure.
Figure 3:
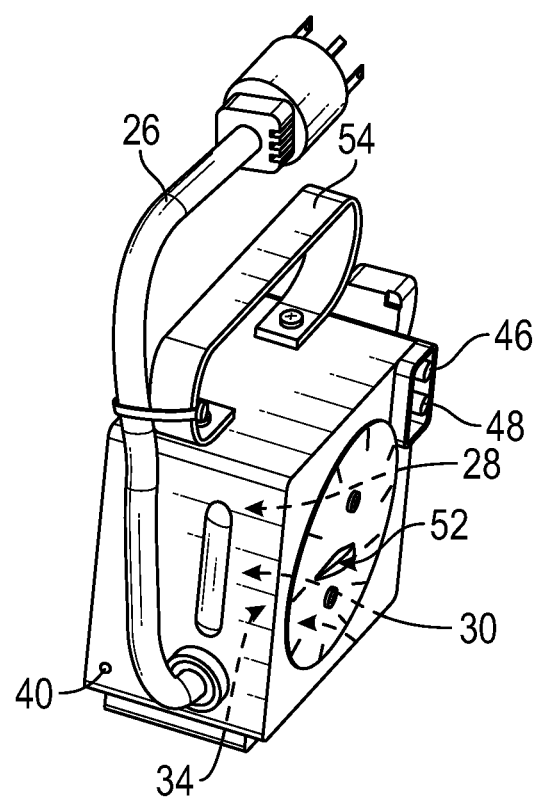
FIG. 3 is an isometric perspective view of an embodiment of the disclosure.
Figure 4:
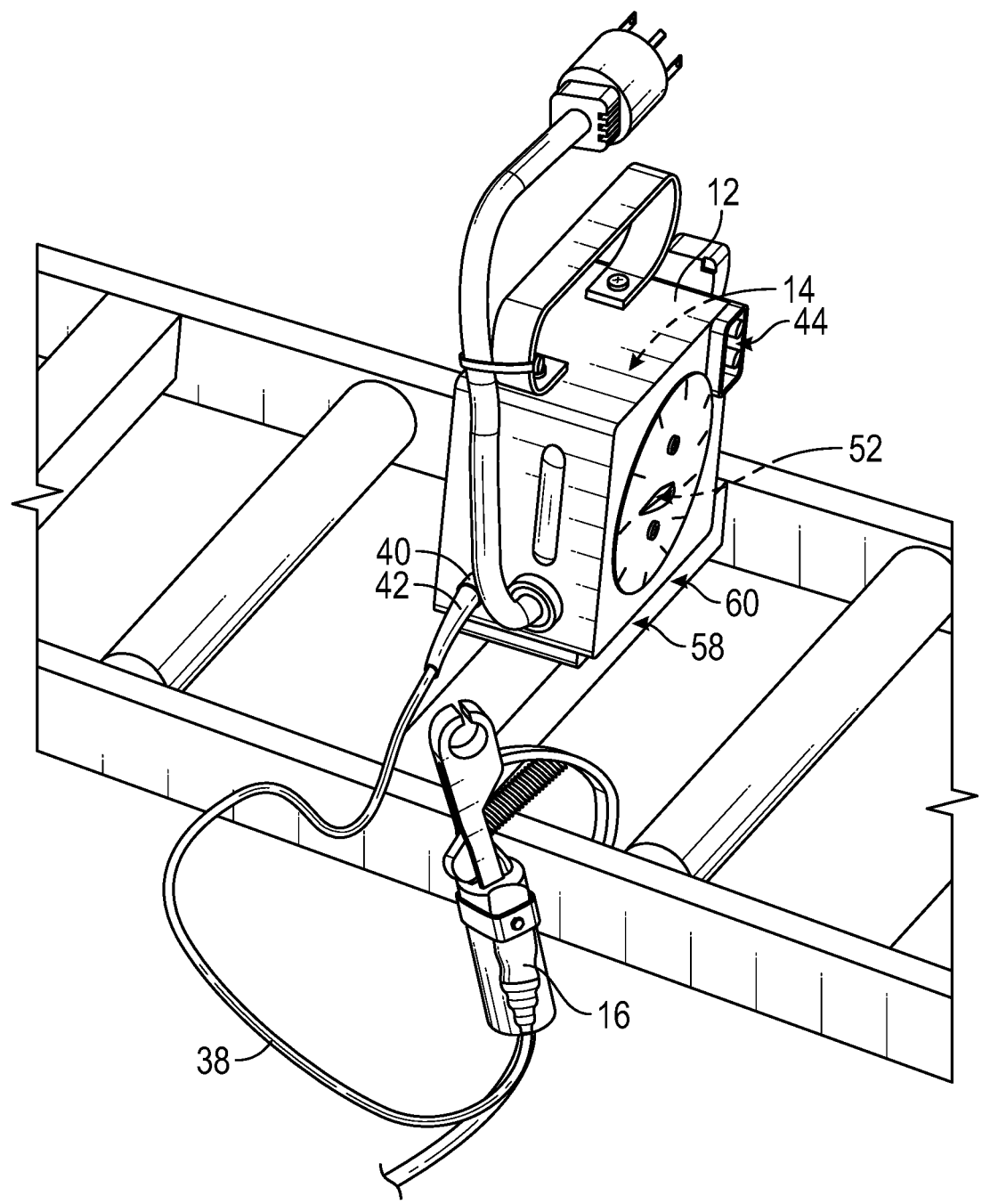
FIG. 4 is an in-use view of an embodiment of the disclosure.

With reference now to the drawings, and in particular to FIGS. 1 through 6 thereof, a new welding machine controller device embodying the principles and concepts of an embodiment of the disclosure and generally designated by the reference numeral 10 will be described.

As best illustrated in FIGS. 1 through 6, the remotely operable welding machine controller device 10 generally comprises a housing 12, which defines an interior space 14, and a remote control 16, which may comprise an Up button 18 and a Down button 20, or other controlling means, such as, but not limited to, dials, touch panels, and the like. A potentiometer 22 and a power supply 24 are attached to the housing 12, with the former being positioned in the interior space 14. A power cord 26 is attached to and extends from the housing 12. The power cord 26 is electrically engaged to the potentiometer 22 and is configured to operationally engage the potentiometer 22 to a source of alternating current.

Figure 5:
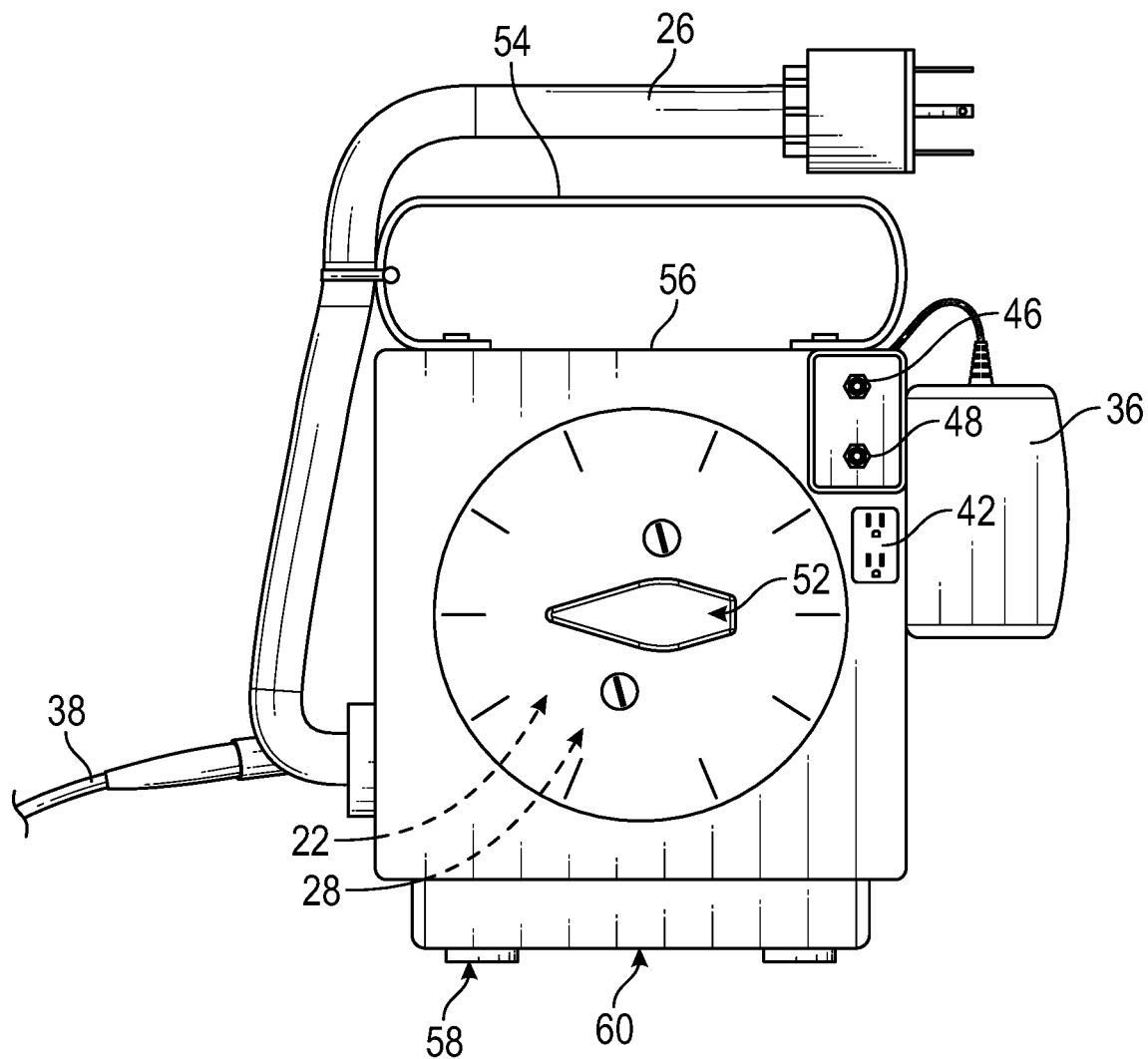
FIG. 5 is a front view of an embodiment of the disclosure.
Figure 6:
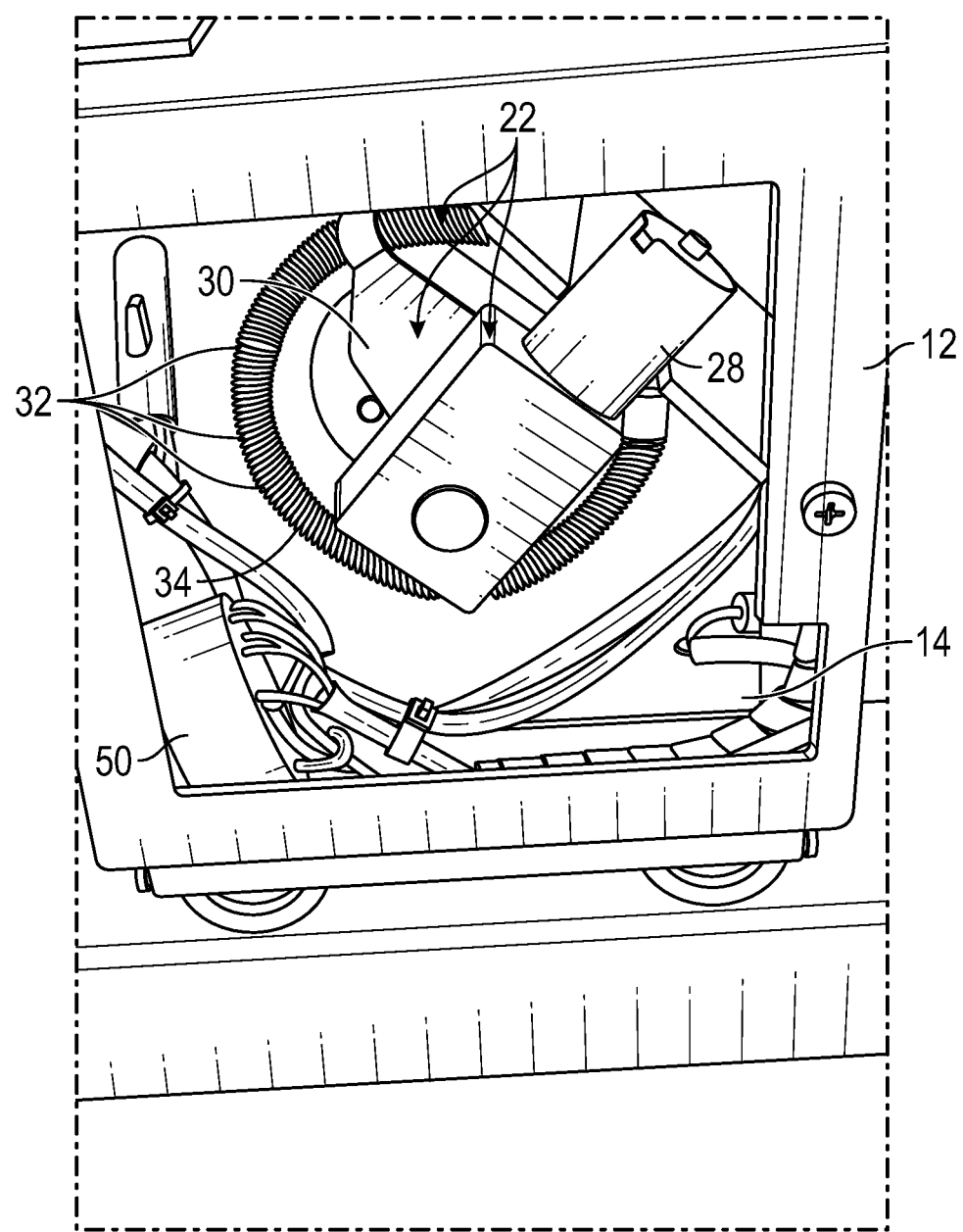
FIG. 6 is an internal view of an embodiment of the disclosure.

A motor 28 is operationally engaged to a slider 30 of the potentiometer 22 and is positioned to selectively motivate the slider 30 along turns 32 of a resistance wire 34 of the potentiometer 22 to adjust a magnitude of current in a circuit in which the resistance wire 34 is included. The power supply 24 is operationally engaged to the motor 28 to selectively power the motor 28. The power supply 24 comprises one or both of a power converter 36, as shown in FIG. 5, or a battery (not shown). The power converter 36 is operationally engaged to the power cord 26 and may be external (as shown in FIG. 5) or internal (not shown) to the housing 12.

The remote control 16 is communicatively engaged to the motor 28 and is configured to be manipulated by a user to selectively actuate the motor 28 to adjust the magnitude of the current in the circuit. With an electrode holder included in the circuit, the user can perform welding distal from the housing 12 while controlling the current. The remote control 16 may be attached to the electrode holder by a variety of attachment means, such as, but not limited to, adhesives, tapes, zip ties, and the like. The present invention also anticipates the remote control 16 being integral to an electrode holder.

A power and communications cable 38 is attached to and extends between the housing 12 and the remote control 16 so that the remote control 16 is communicatively engaged to the motor 28. A first connector 40 is attached to the housing 12 and a second connector 42 is attached to the power and communications cable 38 distal from the remote control 16. The second connector 42 is complementary to the first connector 40 and thus is selectively engageable to the first connector 40 for communicatively engaging the remote control 16 to the motor 28. The present invention also anticipates a transmitter and a receiver (not shown), positioned in the remote control 16 and the housing 12, respectively, thereby allowing for wireless control of the motor 28 by the remote control 16.

An amperage controller 44 is attached to the housing 12 and is operationally engaged to the potentiometer 22. The amperage controller 44 is configured for manual adjustment of a setpoint of an amperage of the current in the circuit. The amperage controller 44 may comprise an Increase button 46 and a Decrease button 48, as shown in FIG. 5, or other controlling means, such as, but not limited to, dials, touch panels, and the like.

A pair of relays 50 is attached to the housing 12 and is positioned in the internal space. The relays 50 are operationally engaged to the power supply 24, the motor 28, and the remote control 16 so that the motor 28 is positioned to selectively increase or decrease the magnitude of the current in the circuit.

A knob 52 is rotationally attached to the housing 12 and is operationally engaged to the slider 30. The knob 52 is configured to be grasped in a hand of the user, positioning the user to adjust a voltage of the current in the circuit. A handle 54 is attached to a top 56 of the housing 12 and is configured to be grasped in a hand of the user to lift the housing 12. A magnet 58 is attached to a bottom 60 of the housing 12 and is configured to magnetically attach the housing 12 to a ferromagnetic substrate. A set of outlets 62 is attached to the housing 12 and is operationally engaged to the power cord 26. Each outlet 62 is configured for insertion of a plug to power a respective electronic device (not shown).

In use, the remote control 16 and the electrode holder are grasped in a hand of a user and welding is performed. As may be required, the remote control 16 is used to adjust the magnitude of the current used in the welding process to obtain a high quality weld.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remotely operable welding machine controller device comprising:
    a housing defining an interior space;
    a potentiometer attached to the housing and positioned in the interior space;
    a power cord attached to and extending from the housing, the power cord being electrically engaged to the potentiometer, wherein the power cord is configured for operationally engaging the potentiometer to a source of alternating current;
    a motor positioned in the interior space and operationally engaged to a slider of the potentiometer, such that the motor is positioned for selectively motivating the slider along turns of a resistance wire of the potentiometer for adjusting a magnitude of current in a circuit in which the resistance wire is included;
    a power supply attached to the housing, the power supply being operationally engaged to the motor for selectively powering the motor;
    a remote control communicatively engaged to the motor, wherein the remote control is configured for being manipulated by a user for selectively actuating the motor for adjusting the magnitude of the current in the circuit;
    an amperage controller attached to the housing and operationally engaged to the potentiometer, wherein the amperage controller is configured for manual adjustment of a setpoint of an amperage of the current in the circuit; and
    a knob rotationally attached to the housing and operationally engaged to the slider, wherein the knob is configured for grasping in a hand of the user, positioning the user for adjusting a voltage of the current in the circuit.

2. The remotely operable welding machine controller device of claim 1, wherein the power supply comprises one or both of a power converter or a battery, the power converter being operationally engaged to the power cord.

3. The remotely operable welding machine controller device of claim 1, wherein the remote control comprises an Up button and a Down button.

4. The remotely operable welding machine controller device of claim 1, further including a power and communications cable attached to and extending between the housing and the remote control, such that the remote control is communicatively engaged to the motor.

5. The remotely operable welding machine controller device of claim 4, further including:

a first connector attached to the housing; and a second connector attached to the power and communications cable distal from the remote control, the second connector being complementary to the first connector, such that the second connector is selectively engageable to the first connector for communicatively engaging the remote control to the motor.

6. The remotely operable welding machine controller device of claim 1, wherein the amperage controller comprises an Increase button and a Decrease button.

7. The remotely operable welding machine controller device of claim 1, further including a pair of relays attached to the housing and positioned in the internal space, the relays being operationally engaged to the power supply, the motor, and the remote control, such that the motor is positioned for selectively increasing or decreasing the magnitude of the current in the circuit.

8. The remotely operable welding machine controller device of claim 1, further including a handle attached to a top of the housing, wherein the handle is configured for grasping in a hand of the user for lifting the housing.

9. The remotely operable welding machine controller device of claim 1, further including a magnet attached to a bottom of the housing, wherein the magnet is configured for magnetically attaching the housing to a ferromagnetic substrate.

10. The remotely operable welding machine controller device of claim 1, further including a set of outlets attached to the housing and operationally engaged to the power cord, wherein each outlet is configured for insertion of a plug for powering a respective electronic device.

11. A remotely operable welding machine controller device comprising:

a housing defining an interior space;

a potentiometer attached to the housing and positioned in the interior space;

a power cord attached to and extending from the housing, the power cord being electrically engaged to the potentiometer, wherein the power cord is configured for operationally engaging the potentiometer to a source of alternating current;

a motor positioned in the interior space and operationally engaged to a slider of the potentiometer, such that the motor is positioned for selectively motivating the slider along turns of a resistance wire of the potentiometer for adjusting a magnitude of current in a circuit in which the resistance wire is included;

a power supply attached to the housing, the power supply being operationally engaged to the motor for selectively powering the motor, the power supply comprising one or both of a power converter or a battery, the power converter being operationally engaged to the power cord;

a remote control communicatively engaged to the motor, wherein the remote control is configured for being manipulated by a user for selectively actuating the motor for adjusting the magnitude of the current in the circuit, the remote control comprising an Up button and a Down button;

a power and communications cable attached to and extending between the housing and the remote control, such that the remote control is communicatively engaged to the motor;

a first connector attached to the housing;

a second connector attached to the power and communications cable distal from the remote control, the second connector being complementary to the first connector, such that the second connector is selectively engageable to the first connector for communicatively engaging the remote control to the motor;

an amperage controller attached to the housing and operationally engaged to the potentiometer, wherein the amperage controller is configured for manual adjustment of a setpoint of an amperage of the current in the circuit, the amperage controller comprising an Increase button and a Decrease button;

a pair of relays attached to the housing and positioned in the internal space, the relays being operationally engaged to the power supply, the motor, and the remote control, such that the motor is positioned for selectively increasing or decreasing the magnitude of the current in the circuit;

a knob rotationally attached to the housing and operationally engaged to the slider, wherein the knob is configured for grasping in a hand of the user, positioning the user for adjusting a voltage of the current in the circuit;

a handle attached to a top of the housing, wherein the handle is configured for grasping in a hand of the user for lifting the housing;

a magnet attached to a bottom of the housing, wherein the magnet is configured for magnetically attaching the housing to a ferromagnetic substrate; and a set of outlets attached to the housing and operationally engaged to the power cord, wherein each outlet is configured for insertion of a plug for powering a respective electronic device.

* * * * *